April 30, 1968  S. HEATH  3,380,505
CAPTIVE CAP NUTS
Filed May 13, 1966

# United States Patent Office 3,380,505
Patented Apr. 30, 1968

3,380,505
CAPTIVE CAP NUTS
Samuel Heath, Faringdon, England, assignor to The Plessey Company Limited, Ilford, Essex, England, a British company
Filed May 13, 1966, Ser. No. 549,861
4 Claims. (Cl. 151—41)

ABSTRACT OF THE DISCLOSURE

Accidental unscrewing of a captive cap nut under vibration is counteracted by click stops provided by a pressure plate on the stem, this plate co-operating with the rear face of the nut and being resiliently supported by a spring washer against a circlip on the stem, and engaging a keyway to prevent its rotation on the stem.

---

This invention relates to cap nuts which are permanently held on a suitable stem, for example an end member of a flexible tube, between a flange and a circlip or other rear abutment, and which hereinafter will be called captive cap nuts. It has for an object to provide an improved captive cap nut combining a simple and compact construction with a reduced tendency to become unscrewed when the cap-nut connection is subjected to vibrations. According to the present invention in its broadest aspect, a click-stop device is interposed between the rear abutment and the nut member, the back surface of the nut member constituting or incorporating one of the elements of the click-stop device, which click-stop device, in addition to the nut member, comprises a pressure plate which encircles the stem and has a key portion co-operating with a keyway provided in the stem to prevent rotation of the pressure plate about the stem, the pressure plate and the back face of the cap nut having co-operating projections and recesses, for example radial ribs on the pressure plate co-operating with radial grooves in the back face of the cap nut, spring means acting between the pressure plate and the rear abutment being provided for urging the pressure plate into contact with the back face of the nut, and the projections and/or recesses being bevelled so as to enable them to be displaced, against the action of the spring means, when sufficient torque is applied to the cap nut. Preferably the spring means comprise a compression spring washer, and a cup washer is preferably interposed between a circlip or other rear abutment and the spring washer or the like to form a casing substantially enclosing the click-stop device proper.

Figure 1:
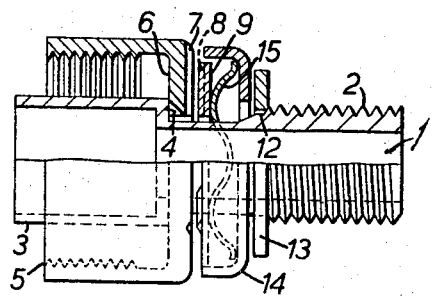
Figure 2:
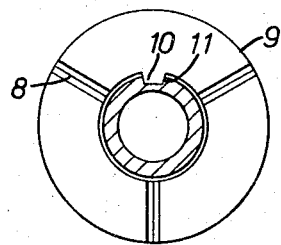

In the accompanying drawing:
FIGURE 1 is a part-sectional side elevation, and
FIGURE 2 is a part sectional end elevtaion of a preferred embodiment forming part of a coupling device.

Referring now to the drawing, the stem 1 of the captive cap nut is constituted by a shell which is screwthreaded at its outer side adjacent to one end as shown at 2 and is extended at its other end by a coaxial cup portion 3 forming a shoulder 4 at the end of this stem. A coupling nut in the form of a cap nut 5 surrounds the cup portion 3 and the adjacent end of the stem, resting with its flange 6 on the shoulder 4. The outer face of the flange 6 is formed with radial grooves 7 which face radial raised ribs 8 of a pressure plate 9. This plate likewise surrounds the stem 1 and is formed with an internal key portion which projects into an axially extending keyway 11 at one side of the stem 1. A peripheral groove 12 is provided in the shell adjacent to the inner end of its screw-threaded portion 2, and a circlip 13 is placed into this groove to serve as a rear abutment. It supports a cup washer 14, which likewise surrounds the stem 1, and the open side of which faces the cap nut 5. A compression spring washer 15, also surrounding the stem 1, is placed inside the cup formed by the washer 15, the axial distance between the circlip 13 and the oppossed face of the cap nut 5 being so chosen that the spring washer tends to hold the raised ribs 8 of the pressure plate 9 resiliently in the radial grooves 7 on the outer face of the cap nut flange 6.

Due to this arrangement the nut 5 of the coupling can be turned to effect coupling or uncoupling, with the raised ribs 8 riding resiliently into and out of the grooves 7, but the co-operation of the ribs 8 with the grooves 7 will counteract the risk of the coupling's loosening itself when subjected to vibrations.

It will be readily appreciated that details of the construction illustrated and described may be modified without exceeding the scope of the invention. Thus the pressure plate 9 may have more than one key portion co-operating with a corresponding number of keyways in the stem 1. The raised ribs 8 may, if desired, be replaced by pips, in which case the radial grooves 7 may, or may not, be replaced by dimples. The positioning of the ribs and grooves may be interchanged or balls, located in perforations of the pressure plate and directly co-operating with the spring washer, may perform the function of the raised ribs.

What I claim is:
1. A captive cap nut comprising a cap nut member which is mounted on a stem between a radial flange and a rear abutment, both the flange and the abutment being secured to the stem, the rear face of the cap nut being closed except for an opening therein receiving the stem, the transverse dimension of the opening being less than that of the flange, wherein a click-stop device is interposed between the rear abutment and the nut member, the rear face of the nut member incorporating one of the elements of the click-stop device, said click-stop device comprising, in addition to the nut member, a pressure plate which encircles the stem and has a radial key portion co-operating with a longitudinal keyway provided in the stem to prevent rotation of the pressure plate about the stem, the pressure plate and the rear face of the cap nut having co-operating radial projections and recesses, spring means acting between the pressure plate and the rear abutment being provided for urging the pressure plate into contact with the rear face of the nut, and the projections and/or recesses being bevelled so as to enable them to be displaced, against the action of the spring means, when sufficient torque is applied to the cap nut.

2. A captive cap nut as claimed in claim 1, wherein the projections and recesses are radial ribs on the pressure plate co-operating with radial grooves in the back face of the cap nut.

3. A captive cap nut as claimed in claim 1, wherein the spring means comprise a compression spring washer.

4. A captive cap nut as claimed in claim 1, wherein the spring means comprise a compression spring washer, a cup member being interposed between the rear abutment and the spring washer to form a casing substantially enclosing the click-stop device proper.

References Cited

UNITED STATES PATENTS

| 1,733,529 | 10/1929 | Dorsey | 151—41 |
| 2,491,406 | 12/1949 | Zeeb | 151—41 |
| 2,731,058 | 1/1956 | Smisko | 151—39 |
| 3,192,980 | 7/1965 | Sauter | 151—69 |

CARL W. TOMLIN, Primary Examiner.
R. S. BRITTS, Assistant Examiner.